(No Model.)
G. EDWARDS & R. BLACKLADGE.
COVERING FOR PIPES.
No. 493,489. Patented Mar. 14, 1893.
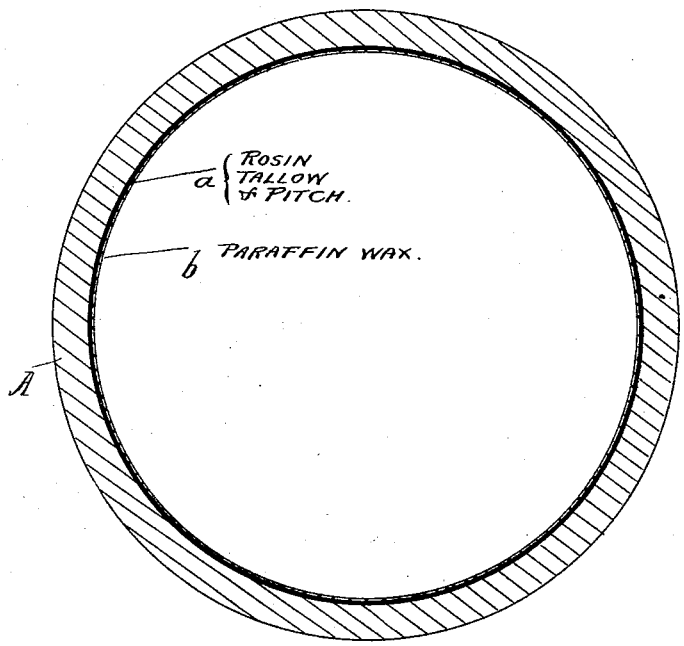
WITNESSES
Walter Allen
Thos E Robertson
INVENTORS
Gwillym Edwards & Robt Blackladge
by Herbert W. T. Jenner
Attorney

UNITED STATES PATENT OFFICE.

GWILLYM EDWARDS, OF EDWARDSDALE, AND ROBERT BLACKLADGE, OF LARKSVILLE, PENNSYLVANIA.

COVERING FOR PIPES.

SPECIFICATION forming part of Letters Patent No. 493,489, dated March 14, 1893.

Application filed October 12, 1892. Serial No. 448,634. (No model.)

*To all whom it may concern:*

Be it known that we, GWILLYM EDWARDS, residing at Edwardsdale, and ROBERT BLACKLADGE, residing at Larksville, county of Luzerne, State of Pennsylvania, citizens of the United States, have invented certain new and useful Improvements in Coverings for Pipes; and we do hereby declare the following to be a full, clear, and exact description of the invention, such as will enable others skilled in the art to which it appertains to make and use the same.

This invention relates to coverings for pipes and other metallic surfaces which are exposed to the corrosive action of impure water in mines and other places.

This invention consists in the novel combination of ingredients for coating or covering the said metallic surfaces, as hereinafter fully described and claimed.

The drawing shows a cross-section through a pipe coated with the novel covering.

In carrying out our invention, we first take twelve parts of rosin, three parts of tallow and four parts of pitch, by weight, and melt them together. The metallic surfaces to be covered should be dry and clean and are preferably heated to a temperature of about 120° Fahrenheit.

In the drawing: A is a pipe, and $a$ is the mixture of rosin, tallow and pitch. This mixture is applied in its melted state to the inside or outside of the heated pipe by means of a brush, or in any other convenient manner. After the mixture $a$ has hardened on the pipe we apply a second coat $b$ consisting of paraffine-wax. This coat $b$ is also applied hot and in a melted condition. These two coats form a waterproof covering which is cheaply and readily applied, and which effectually protects the metal from the corrosive action of impure water.

What we claim is—

A covering for metallic surfaces, consisting of an inner coating of rosin, tallow and pitch mixed together in substantially the proportions set forth, and an outer coating of paraffine-wax.

In testimony whereof we affix our signatures in presence of two witnesses.

GWILLYM EDWARDS.
ROBERT BLACKLADGE.

Witnesses:
CHARLES H. BARLOW,
FRANCIS DOUGLAS.